(12) United States Patent
Shimizu

(10) Patent No.: US 9,117,041 B2
(45) Date of Patent: Aug. 25, 2015

(54) MAGNETIC PROPERTY ANALYZING APPARATUS AND METHOD

(71) Applicant: FUJITSU LIMITED, Kawasaki-shi (JP)

(72) Inventor: Koichi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 518 days.

(21) Appl. No.: 13/648,384

(22) Filed: Oct. 10, 2012

(65) Prior Publication Data

US 2013/0166229 A1    Jun. 27, 2013

(30) Foreign Application Priority Data

Dec. 21, 2011    (JP) ................................. 2011-280544

(51) Int. Cl.
*G06F 19/00*    (2011.01)
*G06F 17/50*    (2006.01)

(52) U.S. Cl.
CPC ........ *G06F 17/5018* (2013.01); *G06F 2217/16* (2013.01)

(58) Field of Classification Search
USPC ............................................ 702/57, 182–185
See application file for complete search history.

(56) References Cited

U.S. PATENT DOCUMENTS 7,236,899 B1 *    6/2007    Shimizu .......................... 702/66
2009/0160896 A1    6/2009    Yamagata et al.

FOREIGN PATENT DOCUMENTS

JP    2009-148993    7/2009

* cited by examiner

*Primary Examiner* — Edward Raymond
(74) *Attorney, Agent, or Firm* — Fujitsu Patent Center

(57) ABSTRACT

A magnetic property analyzing apparatus includes a first computing unit to perform a magnetic field analysis utilizing a FEM using an average magnetization given with respect to each of elements to which an analyzing target is segmented, and a second computing unit that computes an effective magnetic field acting on each element using a magnetic field computed by the magnetic field analysis, computes magnetization vectors within each element by obtaining a time integral of a LLG equation using the effective magnetic field, and computes an average magnetization for each element by averaging the magnetization vectors.

18 Claims, 16 Drawing Sheets

FIG.17

|        | TYPE A | TYPE B | TYPE C | TYPE D | TYPE E | TYPE F | TYPE G |
|--------|--------|--------|--------|--------|--------|--------|--------|
| H [mm] | 40     | 20     | 10     | 5      | 2.5    | 1.25   | 0      |
| W [mm] | 100    | 100    | 100    | 100    | 100    | 100    | 100    |
| D [mm] | 100    | 100    | 100    | 100    | 100    | 100    | 100    |

MAGNETIC PROPERTY ANALYZING APPARATUS AND METHOD

CROSS-REFERENCE TO RELATED APPLICATIONS

This application is based upon and claims the benefit of priority of the prior Japanese Patent Application No. 2011-280544, filed on Dec. 21, 2011, the entire contents of which are incorporated herein by reference.

FIELD

The embodiments discussed herein are related to a magnetic property analyzing apparatus, a magnetic property analyzing method, and a computer-readable storage medium having stored therein a program for causing a computer to execute a magnetic property analyzing process.

BACKGROUND

Conventionally, a simulation to analyze magnetic properties may be performed by a computer, in order to analyze properties or loss of devices using a magnetic material, such as a motor, a transformer, and the like. The simulation may utilize a magnetic field analyzing technique using the FEM (Finite Element Method). The magnetic field analyzing technique using the FEM may analyze a complex shape by segmenting an analyzing target into small meshes.

Other techniques that may be utilized to analyze magnetic properties include micromagnetics. By utilizing the micromagnetics, the computer may reproduce a magnetic domain structure of the magnetic material with a high accuracy.

An analyzing apparatus may create a first equation for computing the magnetic field caused by a current vector generated from the analyzing target, in a format analyzable by the FEM and the BIM (Boundary Integral Method). Such an analyzing apparatus is proposed in a Japanese Laid-Open Patent Publication No. 2009-148993, for example. The proposed analyzing apparatus may create a second equation for computing the magnetic field caused by a magnetization vector generated from the analyzing target, in a format analyzable by the FEM and the BIM. The first and second equations may be used to compute first and second magnetic fields, and a combined magnetic field of the first and second magnetic fields may be regarded as an analysis result of the magnetic field of the analyzing target.

However, when the FEM and another technique are utilized to analyze the magnetic properties of the magnetic material as in the case of the proposed analyzing apparatus described above, the computation based on the FEM may increase the load on the process, to thereby deteriorate the processing speed of the analyzing apparatus as a whole.

SUMMARY

Accordingly, it is an object in one aspect of the embodiment to provide a magnetic property analyzing apparatus, a magnetic property analyzing method, and a computer-readable storage medium, which may improve the processing speed of analyzing the magnetic properties.

According to one aspect of the present invention, a magnetic property analyzing apparatus may include a processor including a first computing unit and a second computing unit, wherein the first computing unit is configured to perform a magnetic field analysis utilizing a FEM (Finite Element Method) by computation, using an average magnetization given with respect to each of elements to which an analyzing target is segmented, wherein the second computing unit includes an effective magnetic field computing unit configured to compute an effective magnetic field acting on each of the elements using a magnetic field computed by the magnetic field analysis as a fixed value; a magnetization vector computing unit configured to compute magnetization vectors within each of the elements by obtaining a time integral of a LLG (Landau Lifshitz Gilbert) equation using the effective magnetic field computed by the effective magnetic field computing unit; and an average magnetization computing unit configured to compute the average magnetization for each of the elements by averaging the magnetization vectors computed by the magnetization vector computing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram illustrating dimensions of the magnetic models input to the magnetic property analyzing apparatus.

DESCRIPTION OF EMBODIMENTS

Preferred embodiments of the present invention will be described with reference to the accompanying drawings.

A description will now be given of the magnetic property analyzing apparatus, the magnetic property analyzing method, and the computer-readable storage medium in each embodiment according to the present invention.

[Structure]

Figure 1:
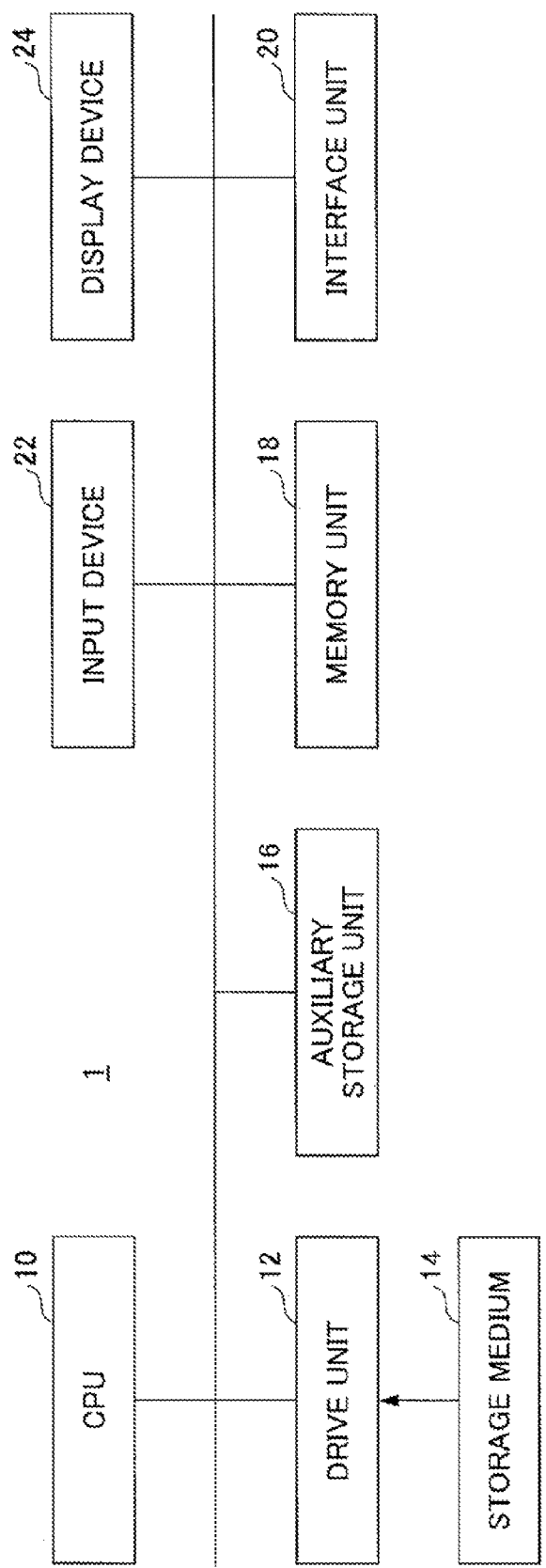
FIG. 1 is a block diagram illustrating an example of a hardware structure of a magnetic property analyzing apparatus in an embodiment of the present invention.

FIG. 1 is a block diagram illustrating an example of a hardware structure of a magnetic property analyzing apparatus in an embodiment of the present invention. A magnetic property analyzing apparatus 1 illustrated in FIG. 1 may include a CPU (Central Processing Unit) 10, a drive unit 12, an auxiliary storage unit 16, a memory unit 18, an interface unit 20, an input device 22, and a display device 24, which may be connected via a bus, a serial line, and the like.

The CPU 10 is an example of a processor or a processor that may include a program counter, an instruction decoder, various computing units, a LSU (Load-Store Unit), general-purpose registers, and the like.

The drive unit 12 is an example of a device that may read programs and data from a storage medium 14. When the storage medium 14 storing the program is loaded into the drive unit 12, the program may be read from the storage medium 14 and installed into the auxiliary storage unit 16 via the drive unit 12. The storage medium 14 may be formed by any suitable non-transitory computer-readable storage media. Examples of the non-transitory computer-readable storage media may include portable storage media such as a CD (Compact Disk), a DVD (Digital Versatile Disk), and a USB (Universal Serial Bus) memory. For example, the auxiliary storage unit 16 may be formed by a HDD (Hard Disk Drive), a flash memory, and the like.

Instead of installing the program from the storage medium 14, the program may be downloaded from another computer (not illustrated) via a network (not illustrated) and installed in the auxiliary storage unit 16 via the interface unit 20. The network connecting the interface unit 20 to the other computer may be formed by a LAN (Local Area Network), a wireless network, or a combination of wireless and cable networks. The program may be prestored in the auxiliary storage unit 16 or the memory unit 18, when the magnetic property analyzing apparatus 1 is forwarded to a user, for example.

The CPU 10 may execute one or more programs installed or prestored in the manner described above, in order to realize a magnetic property analyzing function or process of the magnetic property analyzing apparatus 1.

For example, the memory unit 18 may include a RAM (Random Access Memory), a ROM (Read Only Memory), a EEPROM (Electrically Erasable Programmable ROM), a flash memory, and the like. The interface unit 20 may control the connection of the magnetic property analyzing apparatus 1 to the network.

The input device 22 may include a keyboard, a mouse, buttons, a touch pad, a touch-screen panel, a microphone, and the like, for example. The display device 24 may include a LCD (Liquid Crystal Display), a CRT (Cathode Ray Tube), and the like, for example. Of course, the magnetic property analyzing apparatus 1 may include types of output devices other than the display device 24, such as a printer, a speaker, and the like.

Figure 2:
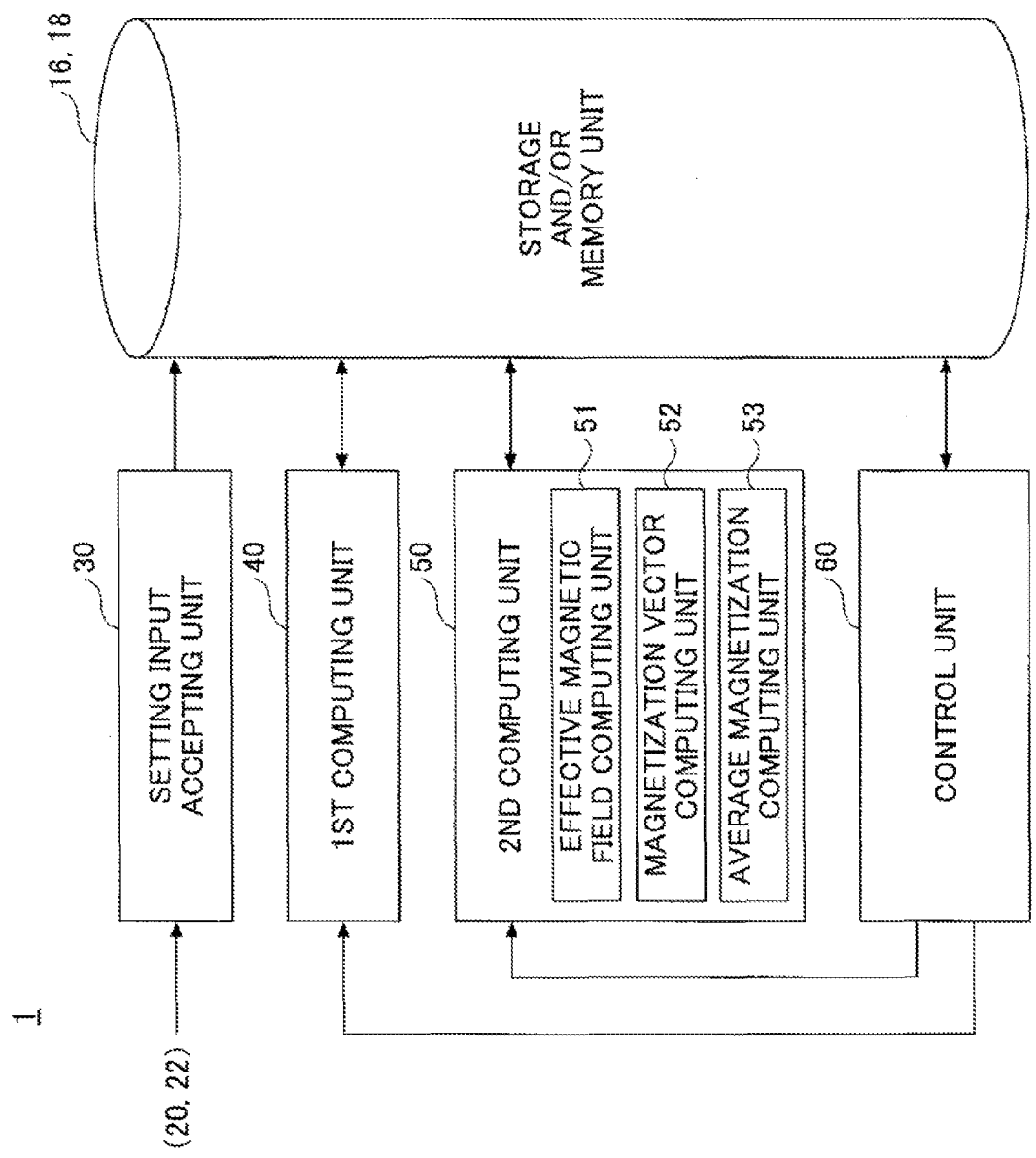
FIG. 2 is a diagram illustrating an example of a functional structure of the magnetic property analyzing apparatus in a first embodiment.

FIG. 2 is a diagram illustrating an example of a functional structure of the magnetic property analyzing apparatus in a first embodiment. The magnetic property analyzing apparatus 1 illustrated in FIG. 2 may include a setting input accepting unit 30, a first computing unit 40, a second computing unit 50, and a control unit 60. The second computing unit 50 may include an effective magnetic field computing unit 51, a magnetization vector computing unit 52, and an average magnetization computing unit 53. The units (or modules) 30, 40, 50, and 60 forming the functional structure illustrated in FIG. 2 may be realized when one or more programs (or software) stored in the auxiliary storage unit 16 or the like are executed by CPU 10. The units 30, 40, 50, and 60 may be realized by executing separate programs or, two or more units amongst the units 30, 40, 50, and 60 may be realized by executing one program. In addition, each of the units 30, 40, 50, and 60 may be realized by a subroutine or a function that is called by another program. Further, at least a part of the units 30, 40, 50, and 60 may be realized by hardware, such as a LSI (Large Scale Integrated circuit), an IC (Integrated Circuit), a FPGA (Field Programmable Gate Array), and the like.

The setting input accepting unit 30 may accept inputs of various parameter settings, physical property information of the analyzing target, and the like. The various parameters may include a number N of transient computation steps to compute the magnetic field, a LLG loop number M, a convergence judging threshold value $\epsilon$, a degree of freedom P, an amount of fluctuation of the external magnetic field per unit time, and the like. The physical property information may include fundamental physical property values, properties of the material, anisotropic settings, and the like. The settings may be input via the interface unit 20 or the input device 22, and the input settings may be stored in the auxiliary storage unit 16 or the memory unit 16, for example.

The first computing unit 40 is an example of a magnetic field analyzing unit to perform a magnetic field analysis utilizing the FEM by computation. The second computing unit 50 is an example of a magnetic property analyzing unit to perform a magnetic property analysis (or magnetic property analyzing process) utilizing the micromagnetics by computation. A description will now be given of the FEM and the micromagnetics.

[FEM and Micromagnetics]

(FEM)

Figure 3:
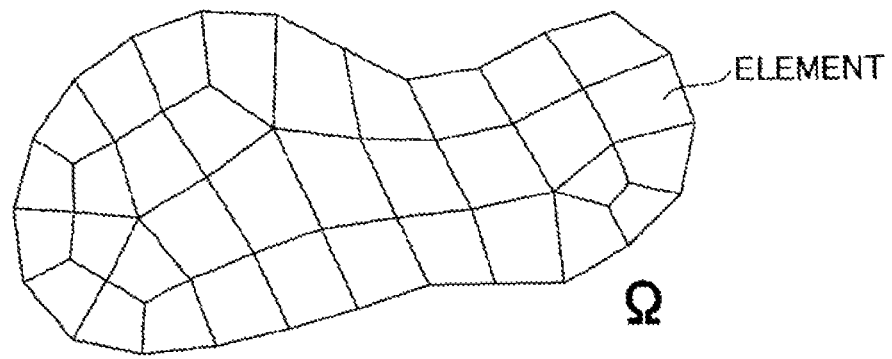
FIG. 3 is a diagram illustrating a state in which an analyzing target is segmented into meshes according to the FEM.

The FEM may segment the analyzing target into a finite number of small regions (or elements) called meshes, in order to obtain a solution. A differential equation that governs the physical states of fluids, structures, magnetic fields, and the like may generally be referred to as a governing equation, in which physical quantities (continuous fields) continuously defined within the air or the material such as solid or fluid are unknown. The FEM is one method of numerically obtain an approximate solution to the differential equation that may be difficult to solve analytically. The FEM may segment a definition region Q of the governing equation originally having an infinite degree of freedom into a finite number of small regions (or elements) called meshes, in order to obtain the solution. FIG. 3 is a diagram illustrating a state in which the analyzing target is segmented into the meshes according to the FEM.

Figure 4:
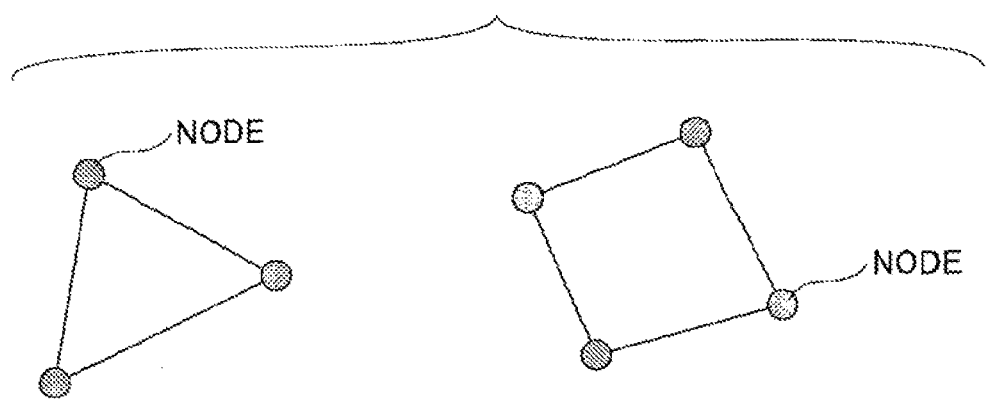
FIG. 4 is a diagram illustrating a triangular element and a rectangular element respectively formed by a plurality of nodes.

The element is a region of a minimum unit obtained by segmenting the region of the analyzing target, and may be formed by a plurality of nodes. FIG. 4 is a diagram illustrating a triangular element and a rectangular element respectively formed by a plurality of nodes. Because the FEM forms the entire model by the small elements in order to obtain the solution, even an analyzing target region having a complex shape may be analyzed.

The Galerkin method (or MWR (Method of Weighted Residuals)) is one example of the magnetic field analyzing technique utilizing the FEM. The Galerkin method may multiply a weighting function having an arbitrary shape on both sides of the governing equation, and obtain a spatial integral in order to effectively reduce the degree of freedom (or perform discretization).

The following equation (1) is a governing equation representing a spatial distribution of a physical variable Ø, where Ø depends on a space X. According to the FEM, the governing equation may be treated as the following linear equation (2) in the process of obtaining the solution, even when the governing equation is nonlinear. In the linear equation (2), F denotes a function of an operator of a spatial differentiation with respect to Ø, and $F_0$ denotes a constant that does not depend on Ø.

$$f(\vec{x}, \phi) = 0 \tag{1}$$

$$F(\vec{x})\phi + F_0 = 0 \tag{2}$$

Figure 5:
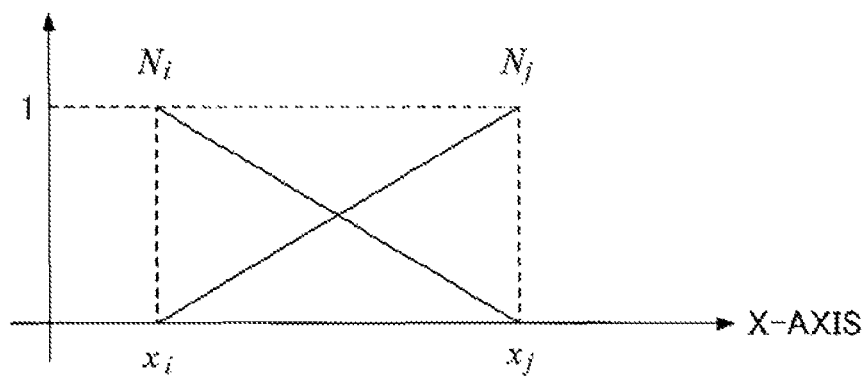
FIG. 5 is a diagram illustrating a one-dimensional interpolation function on a one-dimensional coordinate.

The solution Ø within the element having N nodes may be approximated by the following equation (3) using the interpolation function N. In the equation (3), $Ø_i$ denotes the value of the field at a position $x_i$, and n denotes the number of nodes. In addition, a weighting function w(x) may be defined by the following equation (4) using the interpolation function N. The value of the interpolation function N at the position $x_i$ may have properties represented by the following equation (5). FIG. 5 is a diagram illustrating a one-dimensional interpolation function N on a one-dimensional coordinate.

$$\phi(x) = \sum_{i=1}^{n} \phi_i N_i(x) \tag{3}$$

$$w(x) = \sum_{i=1}^{n} w_i N_i(x) \tag{4}$$

$$N_i(x_j) = \delta_{ij} \tag{5}$$

Next, a description will be given of a technique to solve an equation defined in a two-dimensional space by utilizing the FEM. First, an arbitrary weighting function w is multiplied to both sides of the equation (2), and a surface integral is obtained, to thereby obtain the following equation (6). In addition, when the weighting function w and the solution Ø to be obtained are represented using the interpolation function N, the following equation (7) represents the equation for one element.

$$\int_S wF(\vec{x})\phi \, dS + \int_S wF_0 \, dS = 0 \tag{6}$$

$$\sum_{i=1}^{n}\sum_{j=1}^{n} \int_S w_i N_i F(\vec{x}) \phi_j N_j \, dS + \sum_{j=1}^{n} \int_S w_i N_i F_0 \, dS = 0 \tag{7}$$

By performing the spatial integral in the manner described above, the degree of freedom of the space deteriorates, and as a result, an equation related to the unknown $Ø_i$ is obtained. Because the number of equations related to $Ø_i$ thus obtained corresponds to the number n of the arbitrary weighting functions, the solution Ø may be obtained by solving the simultaneous equations.

(Applying FEM to Magnetic Field Analysis)

The magnetic field for a case in which a magnetization vector →M exists in air may be represented by the following equation (8). In the following description, an alphabet or symbol with an arrow indicated on top in the equations will be represented by the alphabet or symbol preceded by an arrow, such as "→A". In addition, < > represents an average. In the equation (8), →A denotes a vector potential, $v_0$ denotes an inverse number of the space permeability (absolute permeability of vacuum), →$J_0$ denotes an exciting current, and →M denotes the magnetization vector.

$$\frac{\partial \vec{A}}{\partial t} + \vec{\nabla} \times v_0 \vec{\nabla} \times \vec{A} = \vec{J}_0 + v_0 \vec{\nabla} \times \vec{M} \tag{8}$$

The following equation (9) may be obtained when the weighting function w is multiplied to both sides of the equation (8), and the spatial integral is obtained for one element.

$$\int_V \sum_{i=1}^{n}\sum_{j=1}^{n} w_i N_i N_j \frac{\partial \vec{A}_j}{\partial t} dV + \int_V \sum_{i=1}^{n}\sum_{j=1}^{n} w_i N_i (\vec{\nabla} \times v_0 \vec{\nabla} \times N_j \vec{A}_j) dV = \tag{9}$$

$$\int_V \sum_{i=1}^{n} w_i N_i \vec{J}_0 dV + \int_V \sum_{i=1}^{n} w_i N_i v_0 (\vec{\nabla} \times \vec{M}) dV$$

Further, when an integration by parts is performed on a second term on the left side of the equation (9), the following equation (10) may be obtained.

$$\int_V \sum_{i=1}^{n}\sum_{j=1}^{n} w_i N_i (\vec{\nabla} \times v_0 \vec{\nabla} \times N_j \vec{A}_j) dV \vec{A}_j = \tag{10}$$

$$-\int_V \sum_{i=1}^{n}\sum_{j=1}^{n} w_i v_0 (\vec{\nabla} N_i \times \vec{\nabla} \times N_j \vec{A}_j) dV +$$

$$\int_S \sum_{i=1}^{n}\sum_{j=1}^{n} w_i N_i \vec{n} \times v_0 (\vec{\nabla} \times N_j) \vec{A}_j \cdot d\vec{S} =$$

$$-\int_V \sum_{i=1}^{n}\sum_{j=1}^{n} w_i v_0 (\vec{\nabla} N_i \times \vec{\nabla} \times N_j) \vec{A}_j dV + \int_V \sum_{i=1}^{nf} w_i N_i \vec{n} \times \vec{B} \cdot d\vec{S}$$

In the process of deriving a second term on the right side of the equation (10), the following relation equation (11) is used. In addition, a term derived from the magnetization vector M→ may be substituted by the following equation (12) by integration by parts.

$$\sum_{j=1}^{n} (\vec{\nabla} \times N_j) \vec{A}_j = \vec{B} \tag{11}$$

$$\int_V \sum_{i=1}^{n} w_i N_i v_0 (\vec{\nabla} \times \vec{M}) dV = -\int_V \sum_{i=1}^{n} w_i v_0 (\vec{\nabla} N_i \times \vec{M}) dV \tag{12}$$

Coefficients $c_{ij}$, $d_{ij}$, $e_i$, $f_i$, and $g_i$ obtained by the spatial integral of the equation (9) may be represented by the following equations (13) through (17).

$$c_{ij} = \int_V N_i N_j dV \tag{13}$$

$$d_{ij} = -\int_V v_0 (\vec{\nabla} N_i \times \vec{\nabla} \times N_j) dV \tag{14}$$

$$e_i = \int_V N_i dV \tag{15}$$

$$\vec{f}_i \int_V v_0 \vec{\nabla} N_i dV \tag{16}$$

$$g_i = \int_\Gamma N_i dS \tag{17}$$

In addition, when the equation (9) is regarded as an identity with respect to a weight $w_i$ having an arbitrary value, the coefficient of the weight $w_i$ becomes zero, and the following simultaneous equation (18) may be obtained.

$$c_{ij}\frac{\partial \vec{A}_j}{\partial t} + d_{ij}\vec{A}_j = e_i \vec{J}_0 + \vec{f}_i \times \vec{M} - g_i \vec{B} \tag{18}$$

The equation (18) is a simultaneous equation related to an unknown $A_i$ in one element. By combining the simultaneous equations related to the unknown $A_j$ with respect to all of the elements, a simultaneous equation for the entire definition region may be obtained. When indexes i and j in the simultaneous equation (18) in units of elements are respectively substituted by indexes I and J for the entire region, and the following equation (19) may be obtained by a method of solution by division with respect to times n and n+1. When an unknown $A_j^{n+1}$ in the equation (19) is moved to the left side, the following equation (20) may be obtained.

$$c_{IJ}\frac{\vec{A}_J^{n+1} - \vec{A}_J^n}{\Delta t} + d_{IJ}\vec{A}_J^{n+1} = e_I \vec{J}_0 + \vec{f}_I \times \vec{M} - g_I \vec{B} \tag{19}$$

$$\left(\frac{c_{IJ}}{\Delta t} + d_{IJ}\right)\vec{A}_J^{n+1} = -\frac{c_{IJ}}{\Delta t}\vec{A}_J^n + e_I \vec{J}_0 + \vec{f}_I \times \vec{M} - g_I \vec{B} \tag{20}$$

A solution $A_j^{n+1}$ at a time n+1 may be obtained by solving the simultaneous equation related to the unknown $A_j^{n+1}$ as represented by the following equation (21). In a general case in which the magnetic flux does not flow into or out of the boundary of the analyzing region, the vector $\rightarrow B$ in the equation (21) becomes zero, and the following equation (22) stands.

$$\vec{A}_J^{n+1} = \left(\frac{c_{IJ}}{\Delta t} + d_{IJ}\right)^{-1}\left(-\frac{c_{IJ}}{\Delta t}\vec{A}_J^{n+1} + e_I \vec{J}_0 + \vec{f}_I \times \vec{M} - g_I \vec{B}\right) \tag{21}$$

$$\vec{A}_J^{n+1} = \left(\frac{c_{IJ}}{\Delta t} + d_{IJ}\right)^{-1}\left(-\frac{c_{IJ}}{\Delta t}\vec{A}_J^n + e_I \vec{J}_0 + \vec{f}_I \times \vec{M}\right) \tag{22}$$

A magnetic flux density $B^{n+1}$ represented by the following equation (23) may be obtained from the vector potential $A_j^{n+1}$ that is obtained as the solution, where N denotes the interpolation function, and $B^{n+1}$ denotes the value in the target element.

$$\vec{B}^{n+1} = \sum_{i=1}^{n} \vec{\nabla} N_i \times \vec{A}_i \tag{23}$$

A magnetic field $H_j^{n+1}$ may be obtained from the following equation (24) using the magnetic flux density $B^{n+1}$ represented by the equation (23).

$$\vec{H}^{n+1} v_0 (\vec{B}^{n+1} - M) \tag{24}$$

(Magnetic Property Representation Method Based on Micromagnetics)

The magnetization vector computing unit 52 of the second computing unit 50 in this embodiment may integrate the LLG (Landau Lifshitz Gilbert) equation of the micromagnetics, and obtain the magnetization vector $\rightarrow M$ in the steady state in which the LLG equation becomes less than a predetermined value. The LLG equation may be represented by the following equation (25). The LLG equation may be used to analyze the magnetic properties and the magnetic domain structure of the magnetic material. In the equation (25), $\rightarrow M_i$ denotes the magnetization vector, $\rightarrow H_{\mathit{eff}}$ denotes the effective magnetic field acting on the magnetization vector, $\gamma$ denotes a gyro magnetic constant (Hz·m/A), and a denotes a damping constant.

$$\frac{d\vec{M}_i}{dt} = \gamma \vec{M}_i \times \vec{H}_{\mathit{eff}} - \gamma\alpha \vec{M}_i \times \vec{M}_i \times \vec{H}_{\mathit{eff}} \tag{25}$$

The effective magnetic field acting on the magnetization vector may be represented by the following equation (26). In the equation (26), $\rightarrow H_{ani}$ denotes a magneto crystalline anisotropy field, $\rightarrow M_{exe}$ denotes a magnetic exchange coupling field, $\rightarrow H_{external}$ denotes the external magnetic field, and $\rightarrow H$ denotes other magnetic fields (static magnetic field, fields caused by exciting current, eddy current, etc.).

$$\vec{H}_{\mathit{eff}} = \vec{H}_{ani} + \vec{H}_{exc} + \vec{H} + \vec{H}_{external} \tag{26}$$

The LLG equation may be used to analyze the magnetic properties and the magnetic domain structure of the magnetic model having a plurality of partial structures. The magnetization vector of each individual partial structure obtained by solving the LLG equation may be arranged at a position in the respective space, and the magnetic fields (static magnetic field, exchange coupling field) caused by the spatial distribution of the magnetization vector may contribute to the magnetic properties. However, even when the effects of the magnetic fields (static magnetic field, exchange coupling field) depending on the spatial distribution of the magnetization vector are reduced, the magnetic properties of the magnetic material may be reproduced by approximation. Accordingly, the magnetic properties of the magnetic material may be reproduced by approximation, by applying the LLG equation with respect to a parallelepiped model having a suitable size by neglecting the detailed geometrical shape in order to compute the magnetization vectors, and obtaining an average value of the magnetization vectors.

More particularly, the magnetization vectors may be obtained for internal structures that are obtained by further segmenting the elements obtained by segmenting the analyzing target into the meshes, and obtaining an average value of the magnetization vectors for each of the internal structures as the average value of the magnetization vectors of the element.

Figure 6:
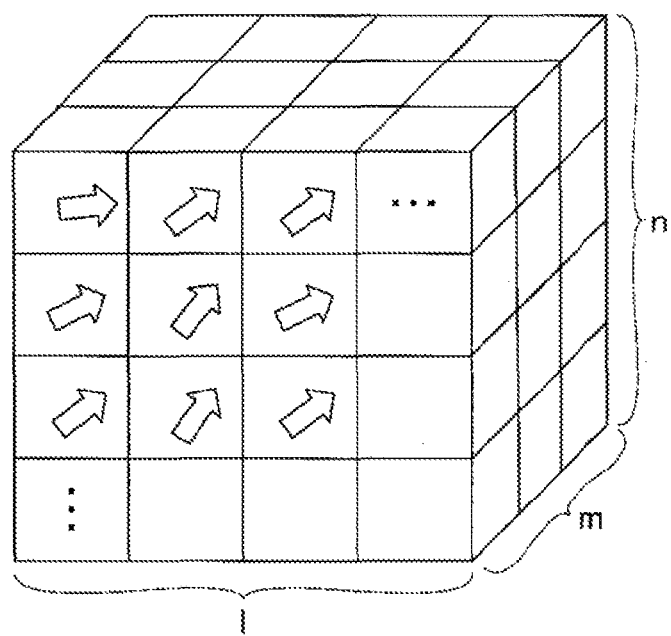
FIG. 6 is a diagram illustrating a plurality of magnetization vectors forming a cube.

FIG. 6 is a diagram illustrating a plurality of magnetization vectors computed for each of the internal structures forming a cube. In FIG. 6, arrows denote directions of the magnetization vectors.

When a number P (or degree of freedom) of the magnetization vectors is represented by P=l×m×n as illustrated in FIG. 6, the average value of the magnetization vectors (or average magnetization) may be represented by the following equation (27).

$$\langle \vec{M} \rangle = \frac{1}{N} \sum_{i=1}^{N} \vec{M}_i \qquad (27)$$

Figure 7:
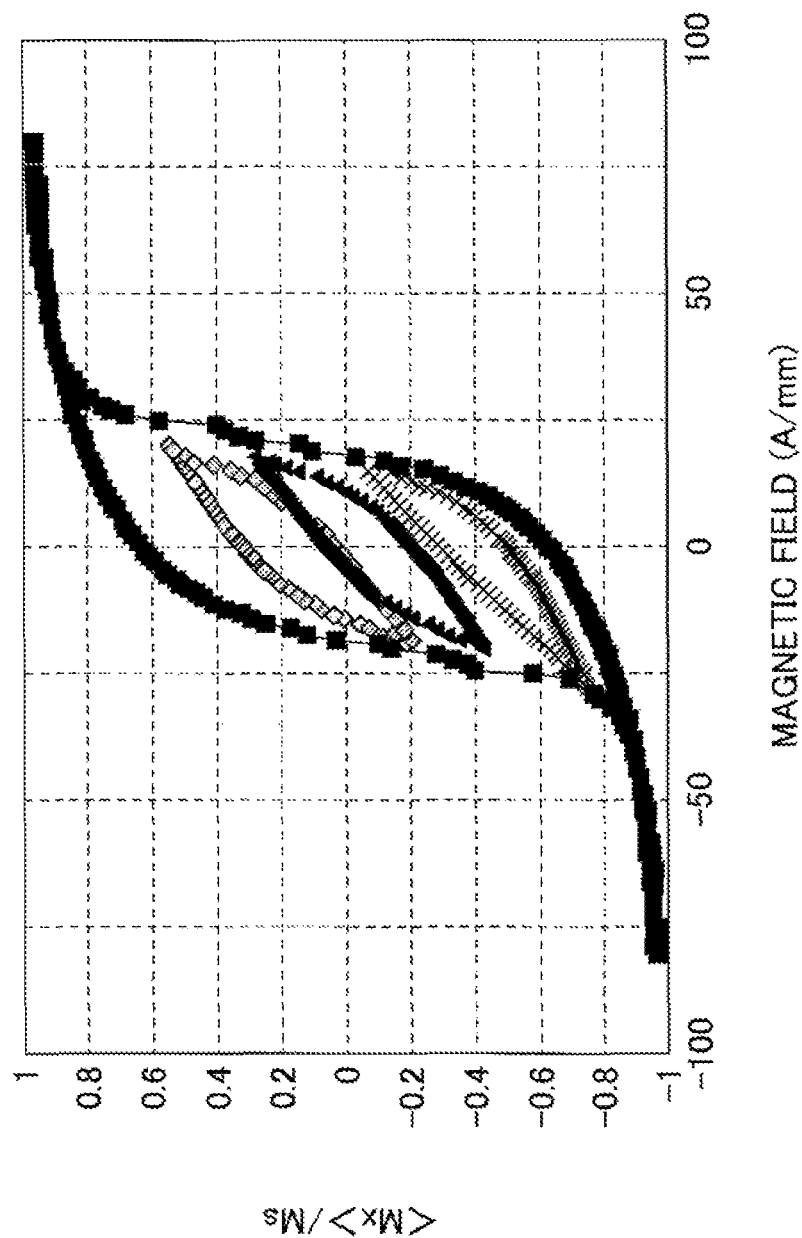
FIG. 7 is a diagram illustrating a relationship of an average value of the magnetization vectors and an external magnetic field.

FIG. 7 is a diagram illustrating a relationship of the average value of the magnetization vectors and the external magnetic field. As illustrated in FIG. 7, magnetic hysteresis may be reproduced accurately by using the average value of the magnetization vectors.

When the LLG equation is applied to the magnetic material, the size of the magnetic material that may be treated becomes limited to several hundred microns. Hence, in the magnetic property analyzing apparatus 1 in this embodiment, the LLG equation is applied with respect to each element that is obtained by segmenting the analyzing target into the meshes utilizing the FEM. As a result, the magnetic properties may be analyzed using the LLG equation, regardless of the shape of the analyzing target or the size of the analyzing target.

[Operation]

Figure 8:
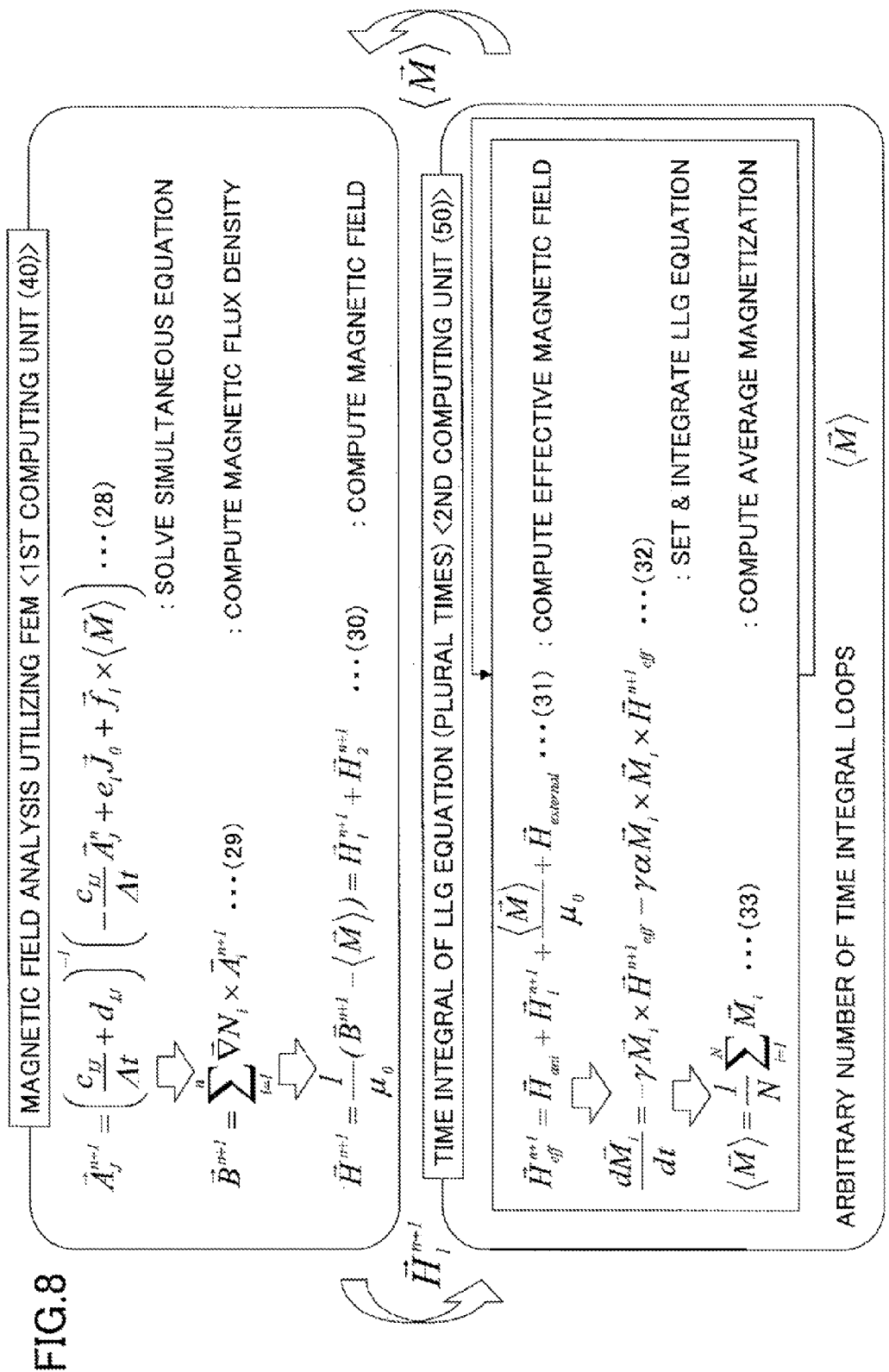
FIG. 8 is a diagram schematically illustrating a process executed by first and second computing units.

FIG. 8 is a diagram schematically illustrating a process executed by the first and second computing units 40 and 50. In addition, FIG. 9 is a flow chart for explaining a process executed by the control unit 60.

Figure 9:
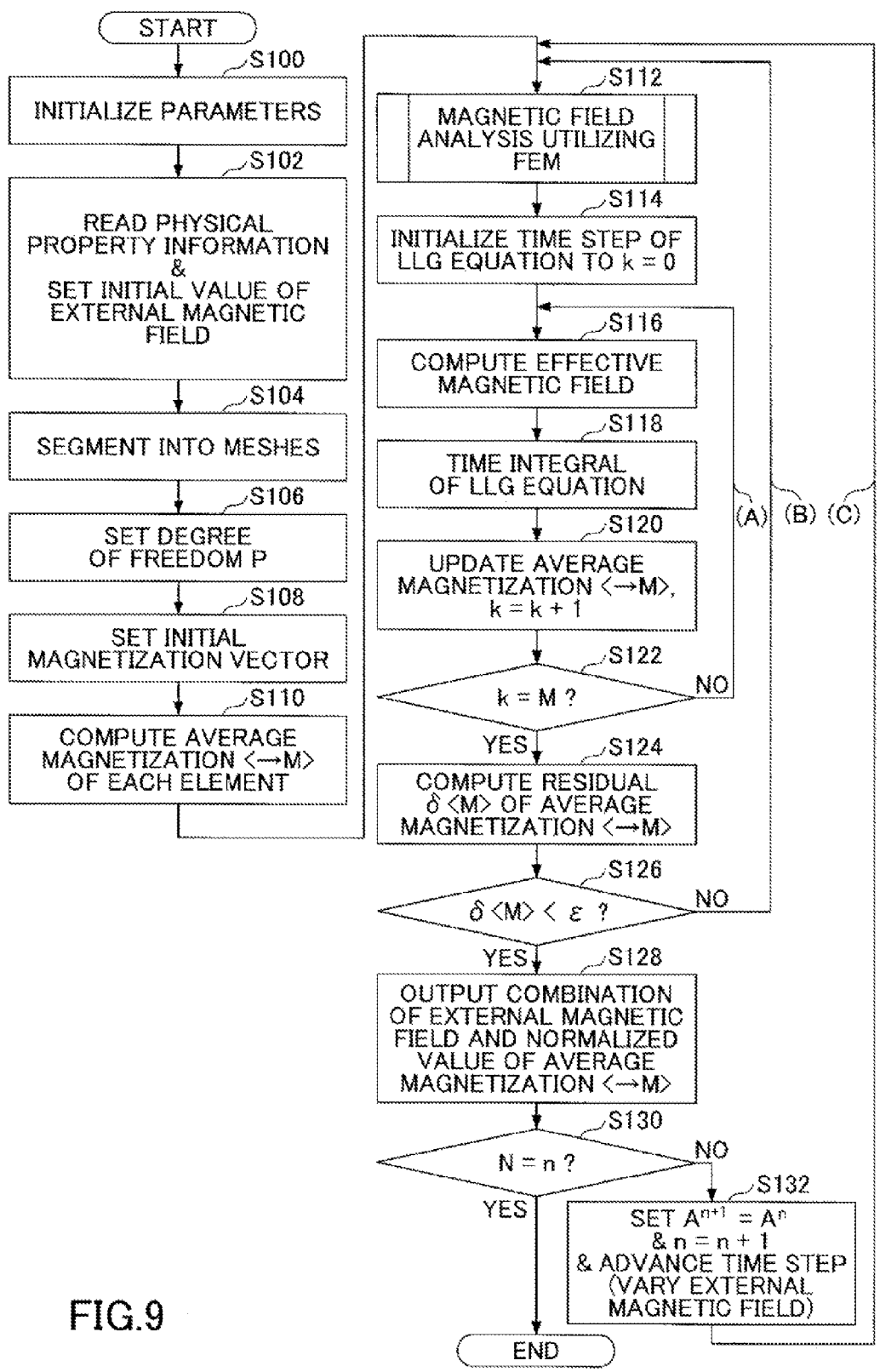
FIG. 9 is a flow chart for explaining a process executed by a control unit.

As illustrated in FIG. 9, the control unit 60 initializes the parameters (step S100). The initializing of the parameters may include specifying the number N of transient computation steps to compute the magnetic field and the LLG loop number M, setting the convergence judging threshold value $\epsilon$, initializing a time-step n of the magnetic field equation, and the like. The control unit 60 may read the value accepted by the setting input accepting unit 30, the default value stored in the auxiliary storage unit 16, and the like, and extract (or unarchive) the read value in the memory unit 18.

Next, the control unit 60 sets the physical property information, and sets the initial value of the external magnetic field $\rightarrow H_{external}$ (step S102). The physical property information and the external magnetic field $\rightarrow H_{external}$ may be a value accepted by the setting input accepting unit 30, a default value stored in the auxiliary storage unit 16, and the like, and the control unit 60 may extract (or unarchive) the read value in the memory unit 18.

Further, the control unit 60 sets a plurality of elements by causing the first computing unit 40 to segment the analyzing target into the meshes utilizing the FEM (step S104). The first computing unit 40 may segment the space, including the magnetic material that is the analyzing target, into the meshes forming the plurality of elements.

Next, the control unit 60 sets the degree of freedom P (number of internal structures computing the magnetization vector $\rightarrow M_i$ within each element) to be used for the computation of the LLG equation by the magnetization vector computing unit 52 of the second computing unit 50 (step S106).

In addition, the control unit 60 sets the initial magnetization vector at random, for example, with respect to the internal structure within each of the elements obtained by the segmenting of the analyzing target (step S108). The control unit 60 computes an average magnetization $\langle \rightarrow M \rangle$ of each of the elements, based on the set magnetization vector (step S110). The process of the steps S106 through S110 may be executed by the second computing unit 50.

When the setting of the processing state ends, the control unit 60 controls the first computing unit 40 to perform the magnetic field analysis utilizing the FEM (step S112).

First, the first computing unit 40 substitutes the average magnetization $\langle \rightarrow M \rangle$ computed in the step S110 or a step S120 to be described later, into an equation (28) illustrated in FIG. 8, in order to compute a vector potential $\rightarrow A_j^{n+1}$. Next, the first computing unit 40 computes a magnetic flux density $\rightarrow B^{n+1}$ from an equation (29) illustrated in FIG. 8 based on the vector potential $\rightarrow A_j^{n+1}$, in order to compute a magnetic field $\rightarrow H^{n+1}$ based on an equation (30) illustrated in FIG. 8. The magnetic field $\rightarrow H^{n+1}$ may be decomposed into a component $\rightarrow H_1^{n+1}$ that is obtained by dividing the magnetic flux density $\rightarrow B^{n+1}$ by the space permeability $\mu_0$, and a component $\rightarrow H_2^{n+1}$ that is obtained by dividing a value equal to but having a sign opposite to that of the average magnetization $\langle \rightarrow M \rangle$ by the space permeability $\mu_0$. The first computing unit 40 may output the component $\rightarrow H_1^{n+1}$, that is obtained by dividing the magnetic flux density $\rightarrow B^{n+1}$ by the space permeability $\mu_0$, to the effective magnetic field computing unit 51 of the second computing unit 50.

The magnetic field analysis of the first computing unit 40, utilizing the FEM, may be performed with respect to the entire space including each of the elements that are obtained by the segmenting of the analyzing target. Hence, the magnetic field and the like acting on other elements due to the average magnetization $\langle \rightarrow M \rangle$ of an element are reflected on the analysis results of the magnetic field analysis. Consequently, a characteristic analysis (or behavioral analysis) of the magnetic material according to a time-step equation of the LLG equation may be expanded to the characteristic analysis of a magnetic device having a predetermined size or greater.

When the magnetic field analysis of the first computing unit 40, utilizing the FEM, is completed, the control unit 60 may initialize the time-step k of the LLG equation to k=0 (step S114), and control the second computing unit 50 to execute the following process. That is, the effective magnetic field computing unit 51 of the second computing unit 50 computes the effective magnetic field according to an equation (31) illustrated in FIG. 8 (step S116).

In this example, the effective magnetic field computing unit 51 may use the value computed by the first computing unit 40 in the step S112, as a fixed value for the term $\rightarrow H_1^{n+1}$ in the equation (31). However, the value updated in the step S120 may be recursively reflected on the other component $\langle \rightarrow M \rangle / \mu_0$.

Next, the magnetization vector computing unit 52 of the second computing unit 50 sets the LLG equation represented by an equation (32) illustrated in FIG. 8 for the internal structures of each of the elements, and computes the magnetization vector $\rightarrow M_i$ from the time integral of the LLG equation (step S118).

Moreover, the average magnetization computing unit 53 of the second computing unit 50 obtains and updates the average magnetization $\langle \rightarrow M \rangle$ by obtaining the average value of the magnetization vector $\rightarrow M_i$ according to the equation (33) illustrated in FIG. 8 for each of the elements, in order to increment a time-step k of the LLG equation by one (step S120).

Next, the second computing unit 50 judges whether the time-step k of the LLG equation is equal to the LLG loop number M (step S122). For example, the LLG loop number M may be set to a value on the order of several tens to several hundred.

When the time-step k of the LLG equation is not equal to the LLG loop number M, the second computing unit 50 returns the process to the step S116 in order to execute the loop (A).

When the time-step k of the LLG equation is equal to the LLG loop number M, the process of the second computing unit 50 temporarily ends, and the control unit 60 computes a residual δ<M> of the average magnetization <→M> (step S124). The residual δ<M> may be an index value that is obtained by subtracting the average magnetization <→M> finally computed by the process of the steps S112 through S120 that are previously executed, from the average magnetization <→M> finally computed by the process of the steps S112 through S120 that are currently executed. For example, the residual δ<M> may be a difference of average values <<→M>> of the average magnetizations <→M> computed for each of the elements that are obtained by the segmenting of the analyzing target into the meshes. Furthermore, the residual δ<M> is not limited to the above, and may be a set of the differences of the average magnetizations <→M> computed for each of the elements.

The residual δ<M> may be computed from the following equation (34) or (35), for example. The residual δ<M> may be computed from the equation (35) with a higher accuracy when compared to the equation (34), however, the processing load of the equation (35) is larger when compared to the equation (34). For this reason, the magnetic property analyzing apparatus 1 may switch the equation to be used for computing the residual δ<M>, between the equations (34) and (35), depending on the accuracy required of the analysis, the user settings, and the like.

$$\delta\langle M \rangle = |\langle M \rangle^{n+1} - \langle M \rangle^n| \quad (34)$$

$$\delta\langle M \rangle = \frac{1}{N}\sum_{i=1}^{N}|M_i^{n+1} - M_i^n| \quad (35)$$

When the residual δ<M> is computed, the control unit 60 judges whether the computed residual δ<M> is less than the convergence judging threshold value ε (step S126). In the case in which the residual δ<M> is the difference of the average values <<→M>> of the average magnetizations <→M>, the step S126 may judge whether the difference of average values <<→M>> is less than the convergence judging threshold value ε. In addition, in the case in which the set of the differences of the average magnetizations <→M> computed for each of the elements, the step S126 may judge whether all of the differences in the set are less than the convergence judging threshold value ε.

When the residual δ<M> is greater than or equal to the convergence judging threshold value ε in the step S126, the control unit 60 returns the process to the step S112 in order to perform the magnetic field analysis by the first computing unit 40, utilizing the FEM (to execute a loop (B)).

On the other hand, when the residual δ<M> is less than the convergence judging threshold value ε in the step S126, the control unit 60 may judge that the average magnetization <→M> sufficiently converged with respect to the current external magnetic field →H$_{external}$. Hence, the control unit 60 may output the external magnetic field →H$_{external}$ and a normalized value of the average magnetization <→M> (for example, a value averaged for each element), as parts of the analysis results (step S128) of the magnetic property analyzing apparatus 1. The analysis results may be stored in the memory unit 18, for example, and may be output to be displayed on the display device 24, for example.

Next, the control unit 60 judges whether the time-step n of the magnetic field equation is equal to the number N of transient computation steps (step S130).

When the time-step n of the magnetic field equation is not equal to the number N of transient computation steps in the step S130, the control unit 60 advances the time-step by setting $A^{n+1}$ and n to $A^{n+1}=A^n$ and n=n+1, respectively (step S132). In this state, the control unit 60 may vary the external magnetic field →H$_{external}$ by a predetermined amount, based on an amount of change per unit time of the external magnetic field that is predetermined, and the like. Then, the control unit 60 returns the process to the step S112 in order to perform the magnetic field analysis by the first computing unit (to execute a loop (C)).

Figure 10:
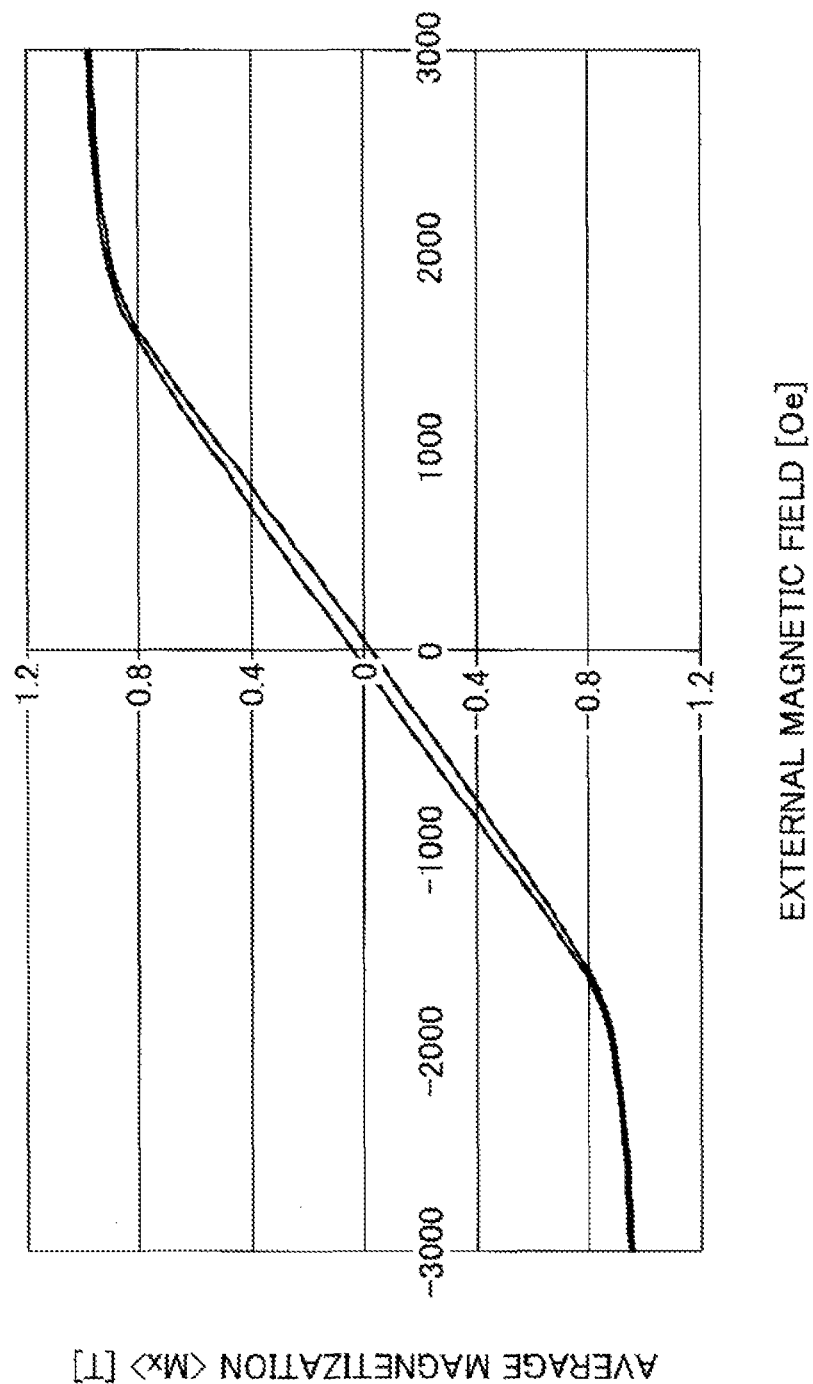
FIG. 10 is a diagram illustrating an example of a screen of analysis results displayed on a display device of the magnetic property analyzing apparatus.

By repeatedly executing the process of the loop (C), a plurality of data formed by a combination of the external magnetic field →H$_{external}$ and the normalized value of the converged value of the average magnetization <→M> when the external magnetic field →H$_{external}$ is applied, are output as parts of the analysis results of the magnetic property analyzing apparatus 1 in this embodiment. FIG. 10 is a diagram illustrating an example of a screen of the analysis results displayed on the display device 24 of the magnetic property analyzing apparatus 1 in this embodiment. As illustrated in FIG. 10, the analysis results of the magnetic property analyzing apparatus 1 include a B-H curve indicating a relationship between the external magnetic field and the average magnetization, for example.

When the time-step n of the magnetic field equation is equal to the number N of transient computation steps in the step S130, the control unit 60 ends the process illustrated in FIG. 9.

The extent to which the external magnetic field →H$_{external}$ is varied in the step S132 may be preset so that one loop is executed by the time the time-step n of the magnetic field equation becomes equal to the number N of transient computation steps, for example.

The magnetic property analyzing apparatus 1 in this embodiment may shorten the convergence time of the average magnetization <→M> by the processes of the loops (A) and (B) described above, in order to improve the processing speed. The magnetic field component $H_1^{n+1}$ computed by the first computing unit 40 based on the vector potential $A_j^{n+1}$ is caused by the magnetization distribution, the exciting current, the eddy current, and the like, and changes gradually when compared to the time in which the average magnetization <→M> varies. A time scale on which the vector potential $A_j^{n+1}$ changes is on the microsecond order, for example, while a time scale on which the average magnetization <→M> changes is on the nanosecond order, for example. For this reason, the time scale on which the average magnetization <→M> changes may be 1/1000 the time scale on which the vector potential $A_j^{n+1}$ changes or less.

As a result, the magnetic field component $H_1^{n+1}$ undergoes a gradual change with time when compared to the magnetic field component $H_2^{n+1}$, and may be treated as being stationary with respect to the change of the magnetic field component $H_2^{n+1}$. On the other hand, the magnetic field component $H_2^{n+1}$ changes together with the average magnetization <→M> within the loop (A) related to the time extraction of the LLG equation, and greatly affects the shape of the B-H curve that may become at least a part of the analysis result.

In addition, because the simultaneous equations related to each of the elements obtained by the segmenting of the analyzing target are to be solved when performing the magnetic field analysis utilizing the FEM, the magnetic field analysis executed in the step S112 in FIG. 9 may require a longer processing time when compared to the time integral of the LLG equation executed in the step S118.

Therefore, in the loop (A), the magnetic field component $H_2^{n+1}$ proportional to the average magnetization <→M> may be varied while maintaining the magnetic field component $H_1^{n+1}$ fixed, in order to shorten the convergence time of the average magnetization $<\rightarrow M>$ in the loop (B).

Moreover, after the process of the step S112 is executed once, the process of the loop (A) may be executed a plurality of times, in order to reduce the number of times the magnetic field analysis utilizing the FEM and requiring a relatively long processing time is executed when compared to a case in which the process of the step S112 and the process of the loop (A) are alternately executed once each. Consequently, the magnetic property analysis may be performed at a high speed and with a high accuracy, by executing the process of the loop (A) a plurality of times after executing the process of the step S112 once.

Comparison Between Embodiment and Conceivable Technique

Next, a description will be given of a comparison between the process of the embodiment and a conceivable technique which alternately executes the magnetic field analysis utilizing the FEM and the time integral of the LLG equation, once each. It is assumed that the processed results of the embodiment matches the processed results of the conceivable technique, for the average magnetization $<\rightarrow M>$ in a case in which the average magnetization $<\rightarrow M>$ converges with respect to the given external magnetic field $\rightarrow H_{external}$.

Figure 11:
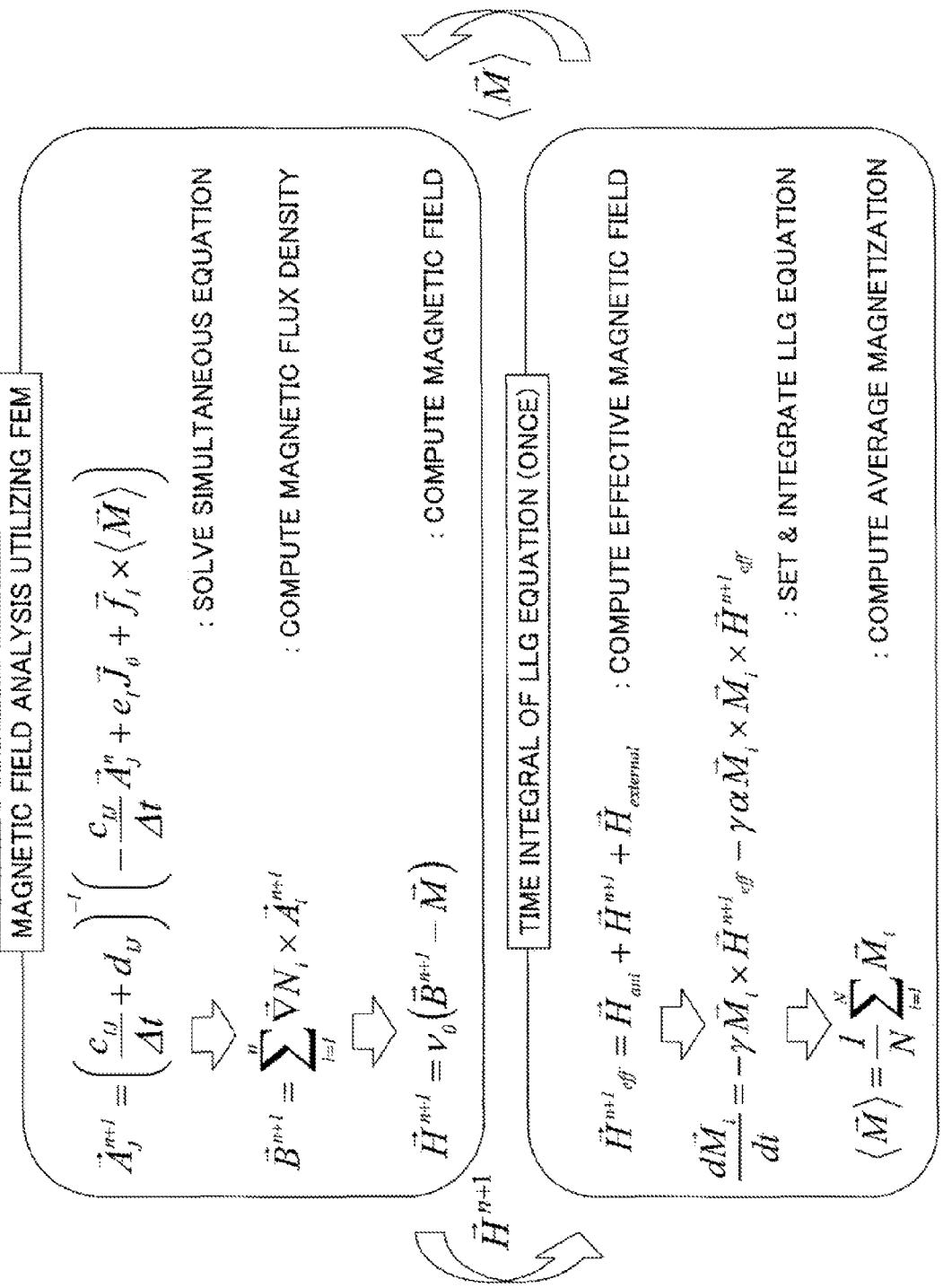
FIG. 11 is a diagram schematically illustrating a process executed by a conceivable technique.

FIG. 11 is a diagram schematically illustrating the process executed by the conceivable technique. In addition, FIG. 12 is a flow chart for explaining the process executed according to the conceivable technique.

According to the conceivable technique, the magnetic field $\rightarrow H^{n+1}$ that is the result of the magnetic field analysis utilizing the FEM is not decomposed in the components $\rightarrow H_1^{n+1}$ and $\rightarrow H_2^{n+1}$, and the magnetic field $\rightarrow H^{n+1}$ in its entirety is used for the computation of the effective magnetic field, as illustrated in FIG. 11. The computing and integration of the LLG equation, and the computing of the average magnetization may be performed in a manner similar to the embodiment described above in conjunction with FIG. 8.

Figure 12:
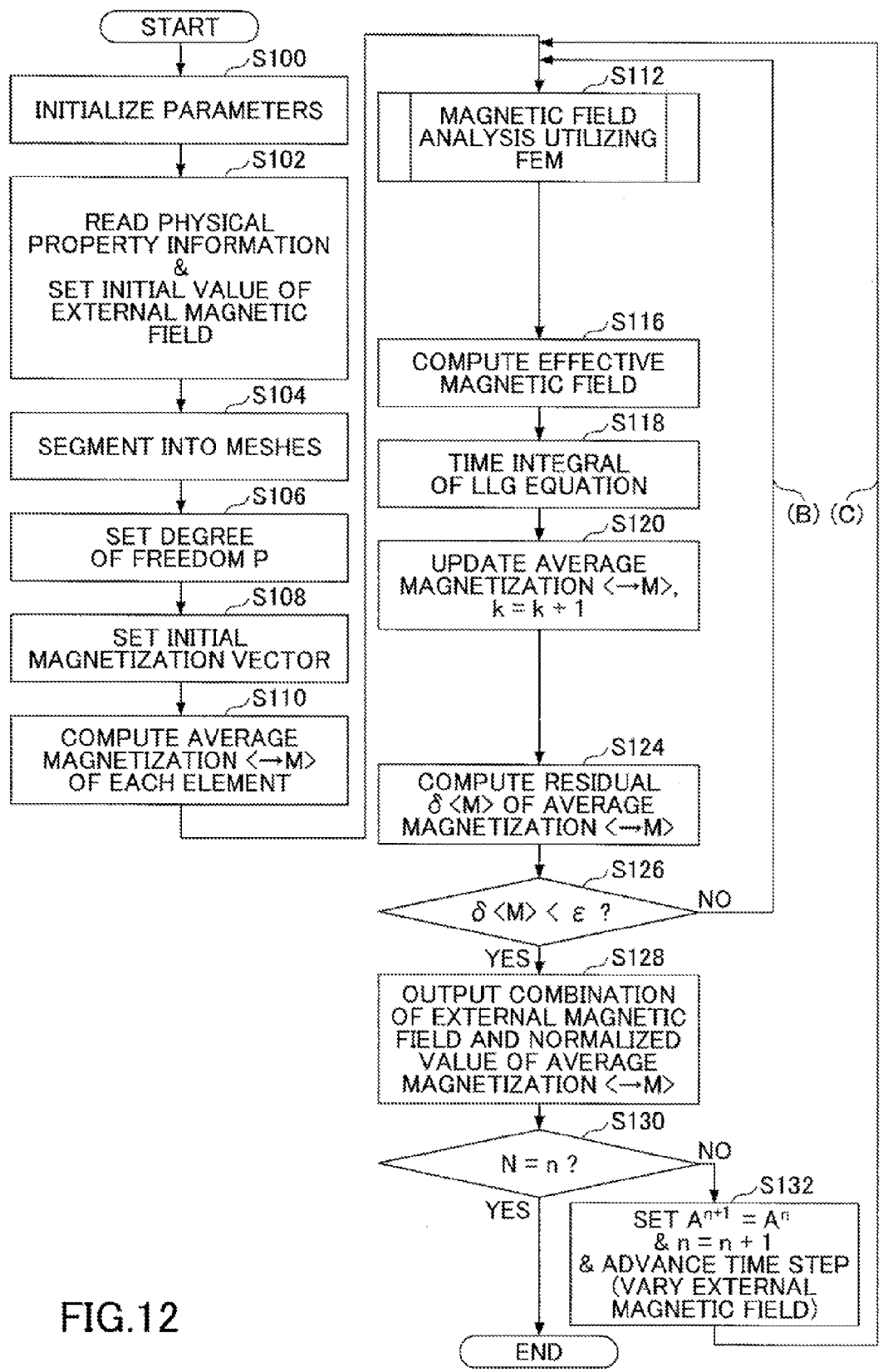
FIG. 12 is a flow chart for explaining the process executed according to the conceivable technique.

When the process of the conceivable technique illustrated in FIG. 12 is compared with the process of the embodiment illustrated in FIG. 9, the steps S114 and S122 and the loop (A) are omitted in the process illustrated in FIG. 12. For this reason, the number of times the loop (B) is executed until the average magnetization $<\rightarrow M>$ converges in FIG. 12 is large compared to that of the embodiment illustrated in FIG. 9.

Figure 13:
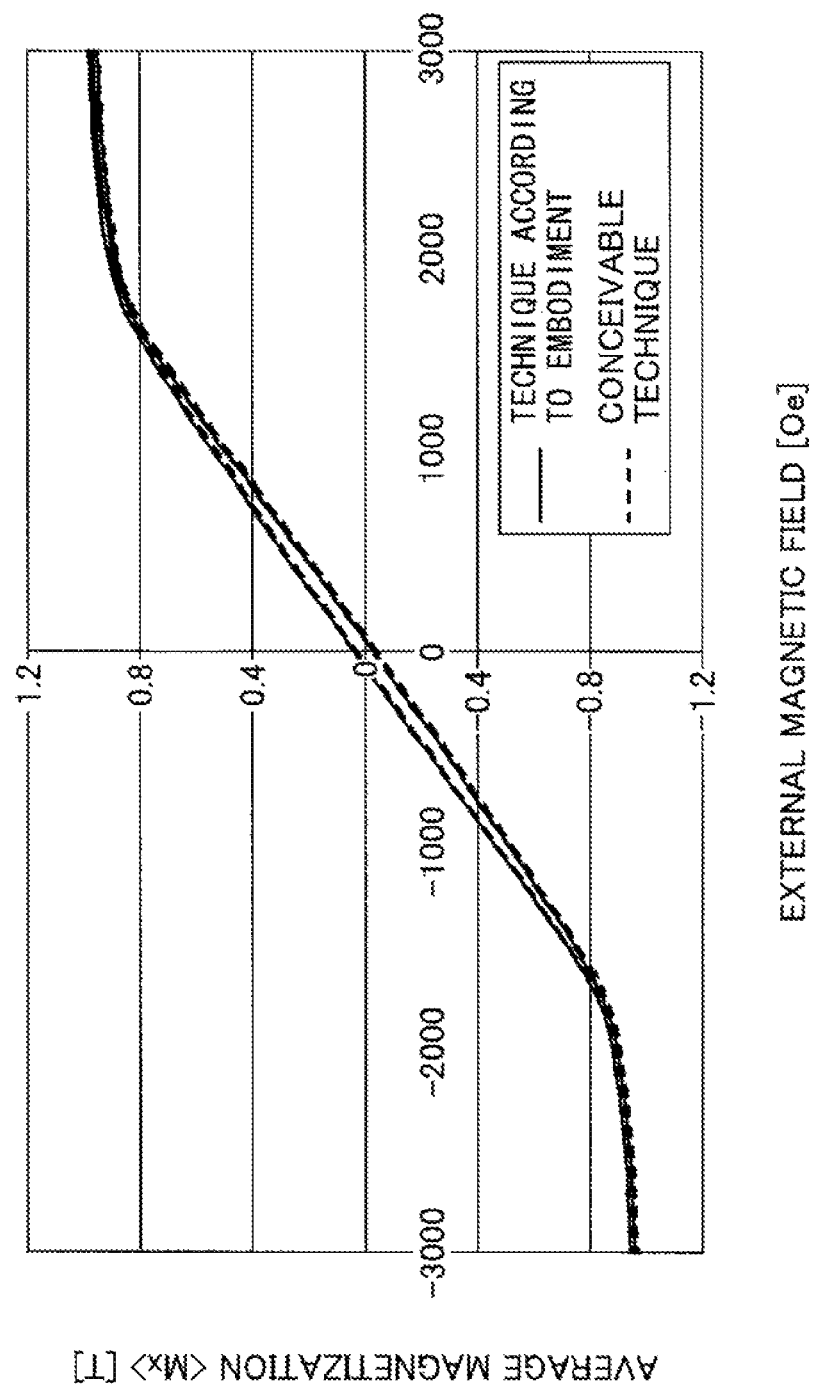
FIG. 13 is a diagram illustrating analysis results obtained by a technique of the embodiment and analysis results obtained by the conceivable technique for comparison purposes.

The present inventor performed simulations of the magnetic property analysis according to the technique of the embodiment illustrated in FIGS. 8 and 9 and according to the conceivable technique illustrated in FIGS. 11 and 12. The simulations were performed with the LLG loop number M set to 200. FIG. 13 is a diagram illustrating analysis results obtained by the technique of the embodiment and analysis results obtained by the conceivable technique for comparison purposes. As may be seen from FIG. 13, it was confirmed that the analysis results obtained by the technique of the embodiment are similar to the analysis results obtained by the conceivable technique.

Figure 14:
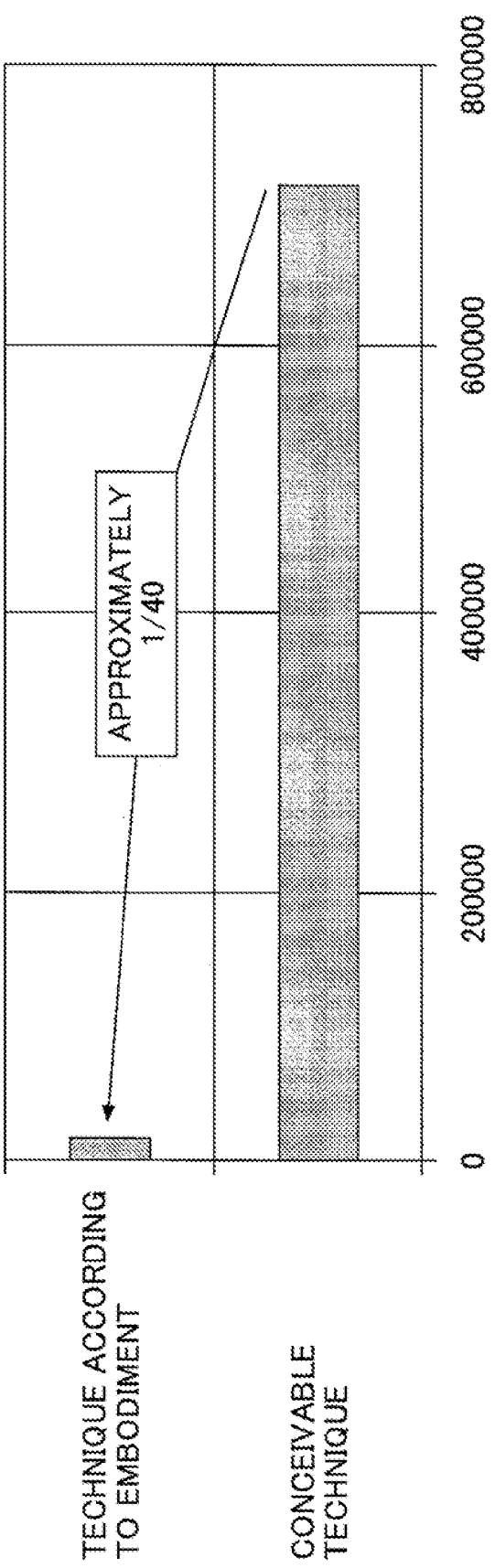
FIG. 14 is a diagram illustrating a number of times a loop is executed according to each of the technique of the embodiment and the conceivable technique for comparison purposes.
Figure 15:
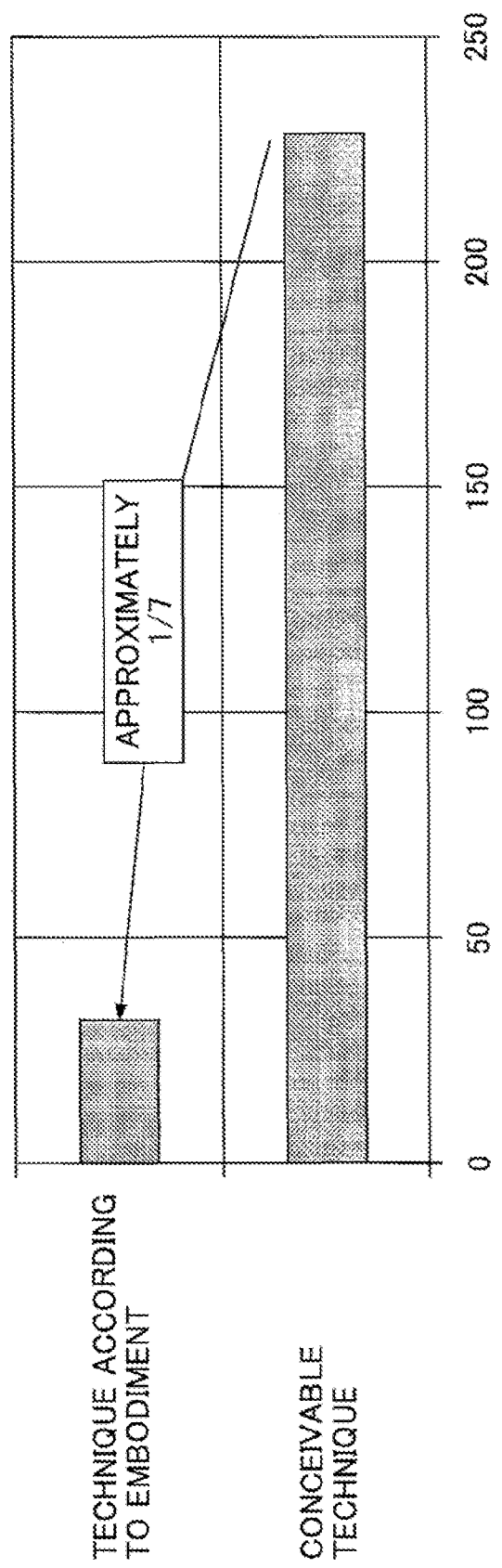
FIG. 15 is a diagram illustrating a processing time according to each of the technique of the embodiment and the conceivable technique for comparison purposes.

In addition, from the simulations of the magnetic property analysis, it was confirmed that the processing time of the technique of the embodiment is short compared to that of the conceivable technique, as illustrated in FIGS. 14 and 15 to be described below.

FIG. 14 is a diagram illustrating the number of times the loop (B) is executed according to each of the technique of the embodiment and the conceivable technique for comparison purposes. As illustrated in FIG. 14, the number of times the loop (B) is executed according to the technique of the embodiment is approximately 1/40 that of the conceivable technique, because the average magnetization $<\rightarrow M>$ converges more quickly compared to the conceivable technique. Because the LLG loop number M is set to 200 in this example, the number of times the steps S116 through S120 in FIG. 9 are executed according to the technique of the embodiment is increased by 5 (200/40) times compared to that according to the conceivable technique.

FIG. 15 is a diagram illustrating the processing time according to each of the technique of the embodiment and the conceivable technique for comparison purposes. As illustrated in FIG. 15, the processing time according to the technique of the embodiment is reduced to approximately 1/7 that according to the conceivable technique.

It may be regarded that the effect of reducing the processing time is obtained for the following reasons. That is, when the processing time required by the magnetic field analysis utilizing the FEM is regarded to be 1, the processing time required for the process of the steps S116 through S120 in FIG. 9 may be approximately 0.02 to approximately 0.025. Hence, when the time required to execute the loop (B) once according to the conceivable technique is regarded to be 1+0.02=1.02, the time required to execute the loop (B) according to the technique of the embodiment becomes 1+0.02×200=5. In addition, because the number of times the loop (B) is executed according to the technique of the embodiment is approximately 1/40 that according to the conceivable technique, the time required to execute the loop (C) once according to the technique of the embodiment becomes 5/40=0.125. When this time of 0.125 is divided by the time 1.02 required to execute the loop (C) once according to the conceivable technique, a ratio 0.125/1.02=0.122 (or approximately 1/8) is obtained. The number of times the loop (C) is executed is arbitrarily determined depending on a varying range of the external magnetic field $\rightarrow H_{external}$ and the like, the ratio (approximately 1/8) of the times required to execute the loop (C) once according to the technique of the embodiment and according to the conceivable technique may be regarded as a ratio of the processing time of the technique according to the embodiment and the processing time according to the conceivable technique.

Therefore, it was confirmed that the technique according to the embodiment may obtain the analysis results similar to those obtained according to the conceivable technique, and that the technique according to the embodiment may reduce the processing time compared to the conceivable technique.

EXAMPLES OF ANALYSIS RESULTS

Figure 16:
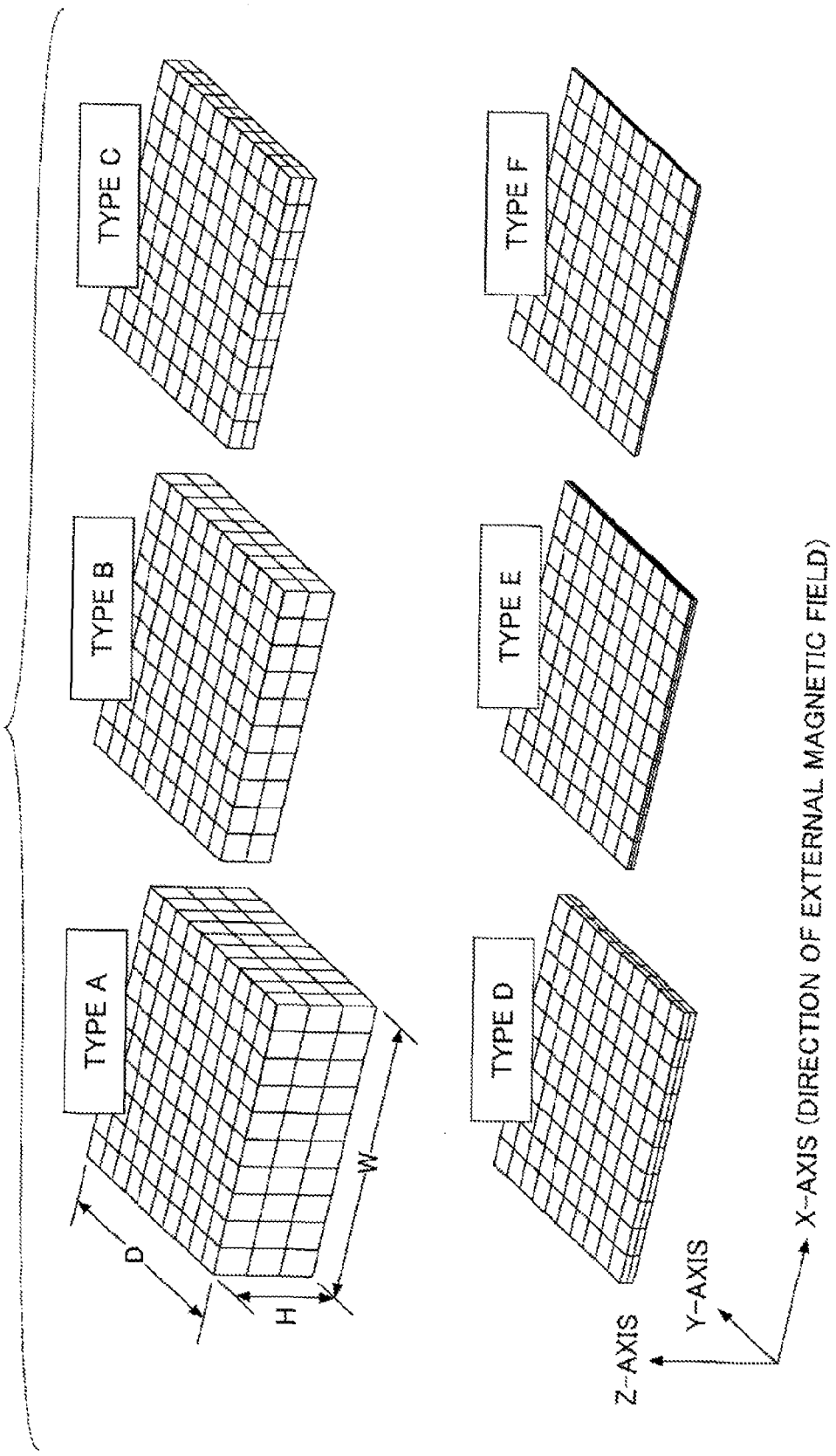
FIG. 16 is a diagram illustrating a plurality of magnetic models that are analyzing targets.

The present inventor also performed simulations on the characteristic analysis of a plurality of magnetic models having different shapes, according to the technique of the embodiment. FIG. 16 is a diagram illustrating the plurality of magnetic models that are analyzing targets. As illustrated in FIG. 16, the magnetic models have a parallelepiped shape with different thicknesses, and are labeled as types A, B, C, D, E, and F. In addition, the magnetic model having a thickness that is 0 is labeled as type G (not illustrated). The effect of the shape of the type A magnetic model having the largest thickness is the largest with respect to the B-H curve, while the effect of the shape of the type G magnetic model having the smallest thickness is the smallest with respect to the B-H curve because the smallest thickness is assumed to be 0. FIG. 17 is a diagram illustrating dimensions of the magnetic models input to the magnetic property analyzing apparatus 1. In FIG. 17, H denotes the height or thickness of the magnetic model, W denotes the width of the magnetic model, and D denotes the depth of the magnetic model. In the simulation, the external magnetic field $\rightarrow H_{external}$ was applied in an X-axis direction in FIG. 16.

Figure 18:
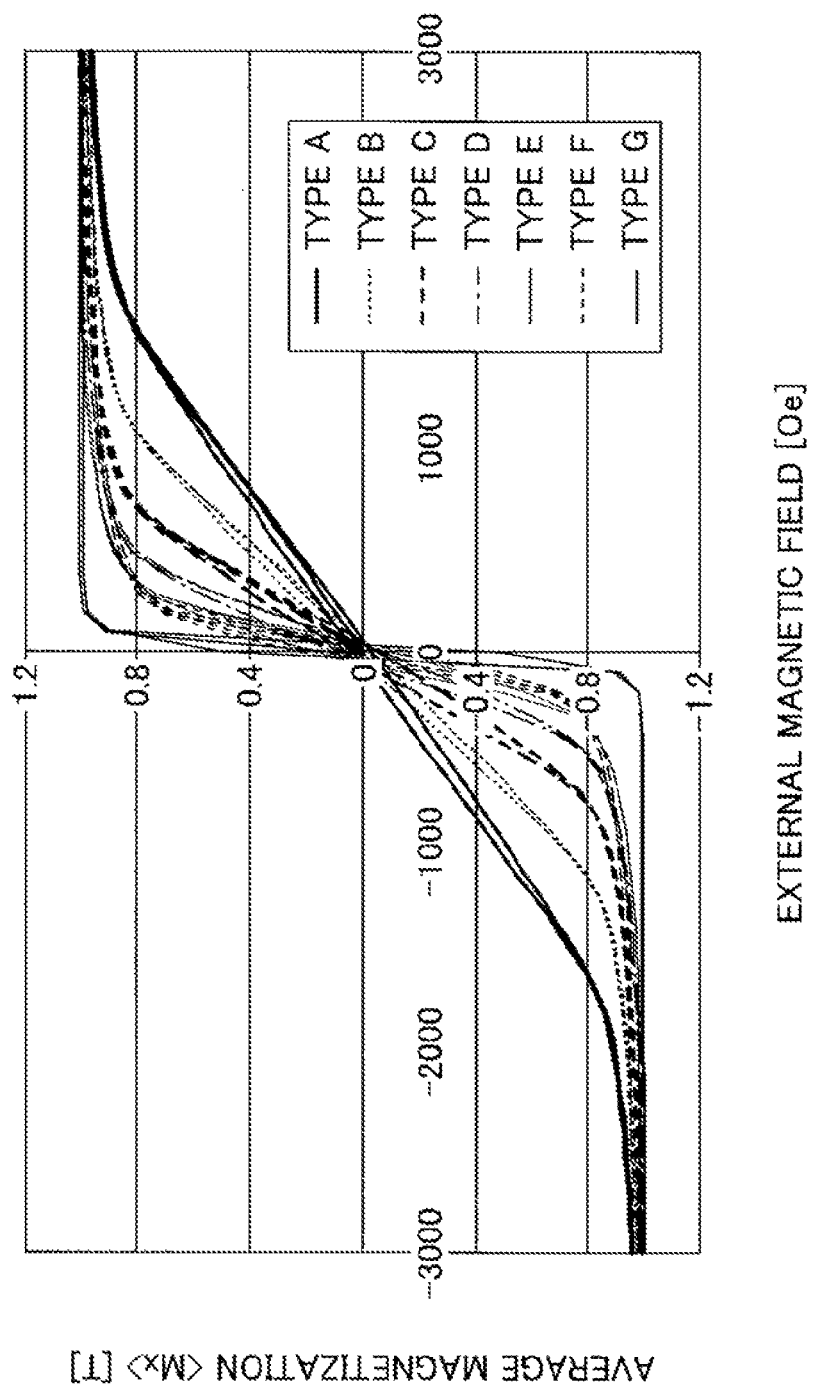
FIG. 18 is a diagram illustrating simulation results obtained by the technique of the embodiment, for the magnetic models having different shapes.

FIG. 18 is a diagram illustrating simulation results obtained by the technique of the embodiment, for the magnetic models having the different shapes illustrated in FIG. 16. As illustrated in FIG. 18, the slope of the B-H curve is the smallest for the type A magnetic model having the largest thickness (or dimensions), and the slope of the B-H curve increases as the thickness of the magnetic model decreases to approach the result of the type G magnetic model having the thickness 0. As a result, it was confirmed that, according to the technique of the embodiment, the effect of the shape of the magnetic material obtained by the magnetic field analysis utilizing the FEM is correctly taken into consideration, with respect to the magnetic model using the LLG equation.

[Summary]

According to the magnetic property analyzing apparatus, magnetic property analyzing method, and computer-readable storage medium in the embodiment, the convergence time of the average magnetization $<\rightarrow M>$ may be reduced because the integration of the LLG equation is performed a plurality of times while keeping the magnetic field component $H_1^{n+1}$ fixed (or constant) and varying the magnetic field component $H_2^{n+1}$. In addition, since the process of the loop (A) is executed a plurality of times after executing the process of the step S112 once, the number of times the magnetic field analysis utilizing the FEM and requiring a relatively long processing time is executed may be reduced compared to that of the conceivable technique. Consequently, the technique of the embodiment may analyzing the magnetic properties at a high speed and with a high accuracy.

Although the LLG loop number M is a fixed value in the example described above, the LLG loop number M may be varied to gradually decrease as the number of times the loop (B) is repeatedly executed (time-step k of the LLG equation) increases, because the varying range (or width) of the average magnetization $<\rightarrow M>$ gradually decreases as the average magnetization $<=M>$ converges.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic property analyzing apparatus comprising:
a processor including a first computing unit and a second computing unit,
wherein the first computing unit is configured to perform a magnetic field analysis utilizing a FEM (Finite Element Method) by computation, using an average magnetization given with respect to each of elements to which an analyzing target is segmented,
wherein the second computing unit includes
an effective magnetic field computing unit configured to compute an effective magnetic field acting on each of the elements using a magnetic field computed by the magnetic field analysis as a fixed value;
a magnetization vector computing unit configured to compute magnetization vectors within each of the elements by obtaining a time integral of a LLG (Landau Lifshitz Gilbert) equation using the effective magnetic field computed by the effective magnetic field computing unit; and
an average magnetization computing unit configured to compute the average magnetization for each of the elements by averaging the magnetization vectors computed by the magnetization vector computing unit.

2. The magnetic property analyzing apparatus as claimed in claim 1, wherein the average magnetization computing unit computes the average magnetization a plurality of times by recursively reflecting on the effective magnetic field a change in the magnetic field depending on the average magnetization.

3. The magnetic property analyzing apparatus as claimed in claim 1, wherein
a first process and a second process are alternately repeated,
the first process includes the magnetic field analysis performed by the first computing unit, and
the second process includes a computing process performed by the effective magnetic field computing unit, a computing process performed by the magnetization vector computing unit, and a computing process performed by the average magnetization computing unit.

4. The magnetic property analyzing apparatus as claimed in claim 1, wherein
the effective magnetic field computing unit computes the effective magnetic field by reflecting a set value of an external magnetic field, and
the processor further includes a control unit configured to make a judgement, after the average magnetization computing unit computes the average magnetization, to determine whether an index value indicating a change from a previous value to a current value of the average magnetization is less than a predetermined value, and to vary the external magnetic field when the index value is less than the predetermined value.

5. The magnetic property analyzing apparatus as claimed in claim 4, wherein the control unit outputs, as analysis results, a combination of a value depending on the average magnetization computed by the average magnetization computing unit when the index value is less than the predetermined value, and the external magnetic field that is set when the index value is less than the predetermined value.

6. The magnetic property analyzing apparatus as claimed in claim 3, wherein a number of times the computing process of the average magnetization computing unit is performed is gradually decreased depending on a lapse of time in which the external magnetic field is fixed.

7. A magnetic property analyzing method comprising:
performing, by a computer, a magnetic field analysis utilizing a FEM (Finite Element Method), using an average magnetization given with respect to each of elements to which an analyzing target is segmented;
first computing, by the computer, an effective magnetic field acting on each of the elements using a magnetic field computed by the magnetic field analysis as a fixed value;
second computing, by the computer, magnetization vectors within each of the elements by obtaining a time integral of a LLG (Landau Lifshitz Gilbert) equation using the effective magnetic field computed by the first computing;

third computing, by the computer, the average magnetization for each of the elements by averaging the magnetization vectors computed by the second computing; and outputting, by the computer, analysis results of the magnetic field analysis.

8. The magnetic property analyzing method as claimed in claim 7, wherein the third computing computes the average magnetization a plurality of times by recursively reflecting on the effective magnetic field a change in the magnetic field depending on the average magnetization.

9. The magnetic property analyzing method as claimed in claim 7, wherein
a first process and a second process are alternately repeated,
the first process includes the performing the magnetic field analysis, and
the second process includes the first computing the effective magnetic field, the second computing the magnetization vectors, and the third computing the average magnetization.

10. The magnetic property analyzing method as claimed in claim 7, wherein the first computing computes the effective magnetic field by reflecting a set value of an external magnetic field, and further comprising:
after the third computing computes the average magnetization, judging, by the computer, to determine whether an index value indicating a change from a previous value to a current value of the average magnetization is less than a predetermined value, and varying the external magnetic field when the index value is less than the predetermined value.

11. The magnetic property analyzing method as claimed in claim 10, wherein the outputting outputs the analysis results including a combination of a value depending on the average magnetization computed by the third computing when the index value is less than the predetermined value, and the external magnetic field that is set when the index value is less than the predetermined value.

12. The magnetic property analyzing method as claimed in claim 9, wherein a number of times the third computing computes the average magnetization is gradually decreased depending on a lapse of time in which the external magnetic field is fixed.

13. A non-transitory computer-readable storage medium having stored therein a program for causing a computer to execute a magnetic property analyzing process comprising:
performing a magnetic field analysis utilizing a FEM (Finite Element Method), using an average magnetization given with respect to each of elements to which an analyzing target is segmented;
first computing an effective magnetic field acting on each of the elements using a magnetic field computed by the magnetic field analysis as a fixed value;
second computing magnetization vectors within each of the elements by obtaining a time integral of a LLG (Landau Lifshitz Gilbert) equation using the effective magnetic field computed by the first computing;
third computing the average magnetization for each of the elements by averaging the magnetization vectors computed by the second computing; and
outputting analysis results of the magnetic field analysis.

14. The non-transitory computer-readable storage medium as claimed in claim 13, wherein the third computing computes the average magnetization a plurality of times by recursively reflecting on the effective magnetic field a change in the magnetic field depending on the average magnetization.

15. The non-transitory computer-readable storage medium as claimed in claim 13, wherein
the magnetic property analyzing process includes a first process and a second process that are alternately repeated,
the first process includes the performing the magnetic field analysis, and
the second process includes the first computing the effective magnetic field, the second computing the magnetization vectors, and the third computing the average magnetization.

16. The non-transitory computer-readable storage medium as claimed in claim 13, wherein
the first computing computes the effective magnetic field by reflecting a set value of an external magnetic field, and
the magnetic property analyzing process includes, after the third computing computes the average magnetization, judging to determine whether an index value indicating a change from a previous value to a current value of the average magnetization is less than a predetermined value, and varying the external magnetic field when the index value is less than the predetermined value.

17. The non-transitory computer-readable storage medium as claimed in claim 16, wherein the outputting outputs the analysis results including a combination of a value depending on the average magnetization computed by the third computing when the index value is less than the predetermined value, and the external magnetic field that is set when the index value is less than the predetermined value.

18. The non-transitory computer-readable storage medium as claimed in claim 15, wherein a number of times the third computing computes the average magnetization is gradually decreased depending on a lapse of time in which the external magnetic field is fixed.

* * * * *